United States Patent
Huber et al.

(10) Patent No.: US 11,912,508 B2
(45) Date of Patent: Feb. 27, 2024

(54) METHOD FOR CONTROLLING A TRANSPORT UNIT OF A TRANSPORT DEVICE IN THE FORM OF A LONG-STATOR LINEAR MOTOR

(71) Applicant: B&R Industrial Automation GmbH, Eggelsberg (AT)

(72) Inventors: Stefan Huber, Eggelsberg (AT); Benjamin Reichenwallner, Eggelsberg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 665 days.

(21) Appl. No.: 17/059,359

(22) PCT Filed: May 27, 2019

(86) PCT No.: PCT/EP2019/063600
§ 371 (c)(1),
(2) Date: Nov. 27, 2020

(87) PCT Pub. No.: WO2019/228955
PCT Pub. Date: Dec. 5, 2019

(65) Prior Publication Data
US 2021/0237981 A1 Aug. 5, 2021

(30) Foreign Application Priority Data
May 30, 2018 (EP) ..................... 18175125

(51) Int. Cl.
*B65G 43/00* (2006.01)
*B65G 23/22* (2006.01)

(52) U.S. Cl.
CPC ............. *B65G 43/00* (2013.01); *B65G 23/22* (2013.01)

(58) Field of Classification Search
CPC ......... B65G 43/00; B65G 23/22; H02P 8/005; H02P 25/06; H02K 41/02; H02K 41/03
(Continued)

(56) References Cited

U.S. PATENT DOCUMENTS

| 4,716,346 A | 12/1987 | Matsuo |
| 6,876,107 B2 | 4/2005 | Jacobs |

(Continued)

FOREIGN PATENT DOCUMENTS

| DE | 35 44 201 | 6/1986 |
| DE | 3544201 C2 * | 6/1986 |

(Continued)

OTHER PUBLICATIONS

Kadynski et al. (CA 2895226 A1) "Method for Operating a Linear Motor Assembly and Linear Motor Assembly" Date Published Jun. 26, 2014 (Year: 2014).*

(Continued)

*Primary Examiner* — Jorge L Carrasquillo
(74) *Attorney, Agent, or Firm* — GREENBLUM & BERNSTEIN, P.L.C.

(57) ABSTRACT

In order to specify a method for controlling a transport unit (TE) of a transport device (1) in the form of a long-stator linear motor, said method allowing safe transport of an object (O) without exposing the object (O) to critical movement limit values, the invention provides that a movement profile of the transport unit (TE) is established at least in sections along the transport path (2) depending on a relative movement profile of a relative point ($P_R$) connected to the transport unit (TE) and spaced at a distance from a reference point ($P_T$) of the transport unit (TE).

18 Claims, 4 Drawing Sheets

Figure 1:
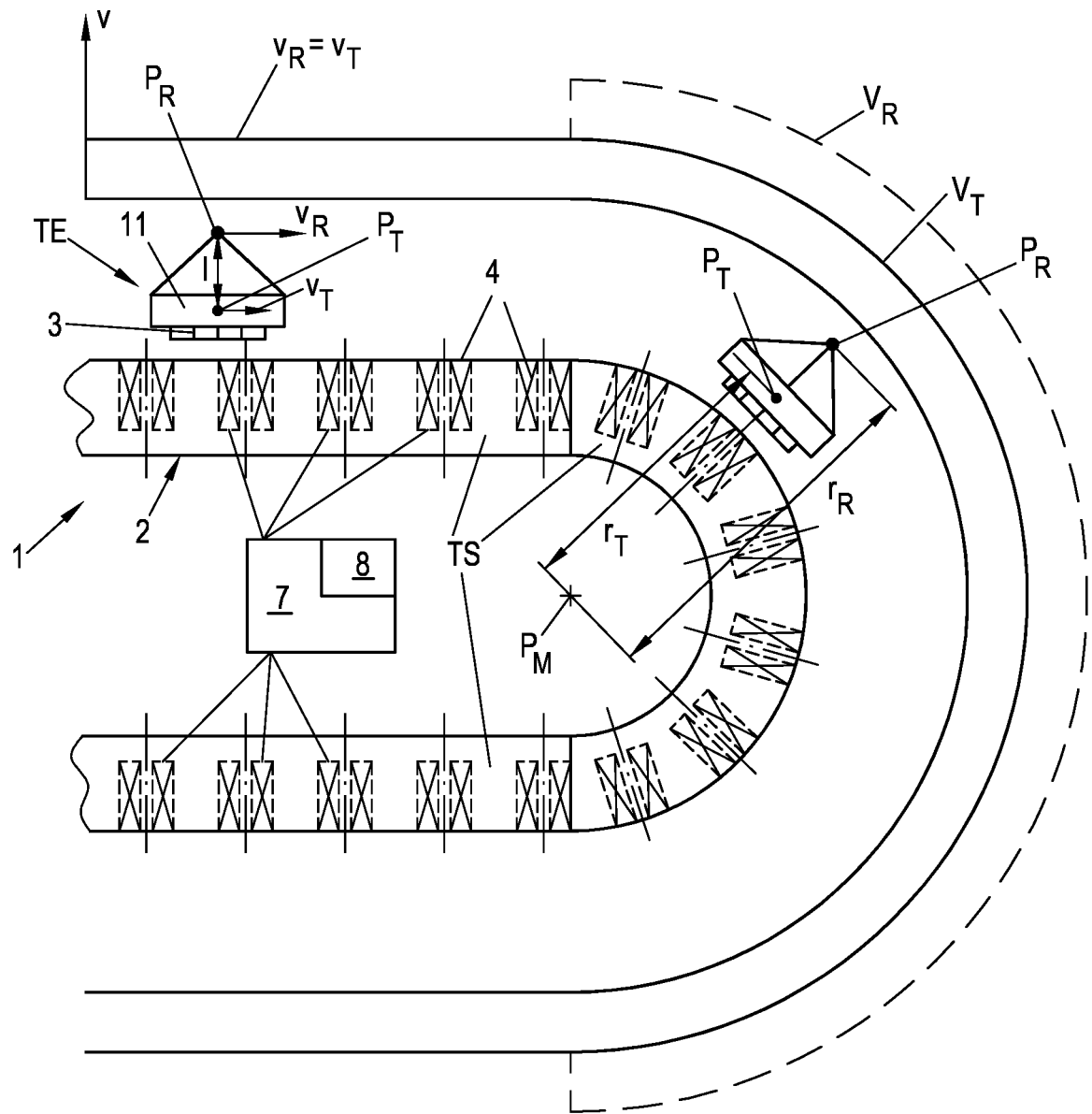

(58) Field of Classification Search
USPC .......................... 318/727, 687, 38, 135, 737
See application file for complete search history.

(56) References Cited

U.S. PATENT DOCUMENTS

| | | | |
|---|---|---|---|
| 10,167,143 | B2 | 1/2019 | Senn et al. |
| 10,181,780 | B2 | 1/2019 | Achterberg et al. |
| 2008/0115372 | A1 | 5/2008 | Vogel et al. |
| 2013/0074724 | A1 | 3/2013 | King et al. |
| 2014/0142792 | A1* | 5/2014 | Hanaka ............... G05D 1/0259 |
| | | | 701/19 |
| 2016/0083130 | A1 | 3/2016 | Garriga Jimenez et al. |
| 2016/0252894 | A1 | 9/2016 | Kram et al. |
| 2017/0247201 | A1 | 8/2017 | Prüssmeier |

FOREIGN PATENT DOCUMENTS

| | | |
|---|---|---|
| DE | 10 2012 025 326 | 6/2014 |
| DE | 10 2014 117150 | 5/2016 |
| EP | 1 898 445 | 3/2008 |
| EP | 2 998 229 | 3/2016 |
| EP | 3 061 576 | 8/2016 |
| JP | H10-244481 | 9/1998 |
| JP | 2007-012720 | 1/2007 |
| WO | 2004/103792 | 12/2004 |
| WO | 2013/143783 | 10/2013 |
| WO | 2015/036196 | 3/2015 |

OTHER PUBLICATIONS

Machiyama et al. (JP 2007012720 A) "Substrate Processing Device, Transportation Device, and Control Method of Transportation Device" Date Published Jan. 18, 2007 (Year: 2007).*

Veit (DE 102012025326 A1) "Method for Operating Electromagnetic Transportation System of Car, Involves Generating Control Commands to Control Units to Operate Movement Profile for Transport Device Based on Activations of Magnetic Coils and Magnetic Coil Groups" Date Published: Jun. 26, 2014 (Year: 2014).*

Int'l Search Report (Form PCT/ISA/210) conducted in Int'l Appln. No. PCT/EP2019/063600 (dated Aug. 27, 2019).

Int'l Written Opinion (Form PCT/ISA/237) conducted in Int'l Appln. No. PCT/EP2019/063600 (dated Aug. 27, 2019).

Int'l Preliminary Examination Report (Form PCT/ISA/409) conducted in Int'l Appln. No. PCT/EP2019/063600 (dated Apr. 8, 2020).

Japan Notice of Refusal conducted in counterpart Japan Appln. No. 2020-566846 (dated May 25, 2023).

Europe Search Report/Office Action conducted in counterpart Europe Appln. No. 18175125.6 (dated Sep. 16, 2021).

* cited by examiner

METHOD FOR CONTROLLING A TRANSPORT UNIT OF A TRANSPORT DEVICE IN THE FORM OF A LONG-STATOR LINEAR MOTOR

The invention relates to a method for controlling a transport unit of a transport device in the form of a long-stator linear motor in direction of movement along a transport path of the transport device, wherein a movement profile of the transport unit by which the transport unit is moved along the transport path is predetermined for a control unit for a defined reference point of the transport unit. The invention further relates to a transport device in the form of a long-stator linear motor with a transport path, at least one transport unit that can be moved in the longitudinal direction along the transport path, and a control unit for controlling the transport unit.

In almost all modern production plants, it is necessary to move parts or components between individual handling or production stations using transport devices, even over longer transport paths. For this purpose, a plurality of transport or conveyor devices are known. Continuous conveyors in various designs are often used for this purpose. Conventional continuous conveyors are conveyor belts in various embodiments in which a rotary movement of an electric drive is converted into a linear movement of the conveyor belt. With such conventional continuous conveyors, flexibility is considerably limited, in particular individual transport of individual transport units is not possible. In order to remedy this situation and to meet the requirements of modern, flexible transport devices, so-called long-stator linear motors (LLM) are increasingly being used as replacements for conventional continuous conveyors.

A long-stator linear motor is distinguished in particular by a better and more flexible utilization over the entire working range of the movement (position, speed, acceleration), an individual regulation/control of the movement of the transport units along the transport path, an improved energy utilization, the reduction of maintenance costs due to the lower number of wear parts, a simple exchange of the transport units, efficient monitoring and fault detection and an optimization of the product flow along the transport path. Examples of such long-stator linear motors can be found in WO 2013/143783 A1, U.S. Pat. No. 6,876,107 B2, US 2013/0074724 A1 or WO 2004/103792 A1.

A long-stator linear motor is known to consist substantially of a long stator in the form of a plurality of drive coils arranged one behind the other and a plurality of transport units having drive magnets (permanent magnets or electromagnets) which are moved along the long stator by appropriate application of an electric current to the drive coils. The drive coils generate a moving magnetic field which interacts with the excitation magnets on the transport units in order to move the transport units. The long stator thus forms a conveying path, along which the transport units can be moved. This makes it possible to control the movement (position, speed, acceleration) of each transport unit individually and independently of each other. For this purpose, each drive coil is controlled by an associated drive coil controller, which can receive instructions (e.g. in the form of setpoint values for position or speed) from a higher-level plant control unit for moving a transport unit. Switches of the long-stator linear motor can also be provided along the conveying path. The long stator is often also constructed in the form of conveyor segments, each conveyor segment forming part of the conveying path and containing a number of drive coils. In most cases, a segment controller is provided for a conveyor segment, which controls all drive coils of the conveyor segment. The structural design of the long-stator linear motor, that is to say for example the design of the drive coils, the conveying path, the transport units, the guides of the transport unit, etc., and the regulation concept can of course be different, but the basic operating principle of a long-stator linear motor remains the same.

US 2014/0142792 A1 discloses a transport device in the form of a long-stator linear motor and a method for controlling a transport unit along a transport path. A position measuring system with measuring magnets provided on the side of the transport unit is proposed in order to measure the position of the transport unit along the transport path. If the measuring sensors measure the position of measuring magnets which are arranged to the side of the drive magnets, the measured position in the curve does not match the position of the center of the transport unit, which is used to control the transport unit. This deviation is taken into account in a control unit for an exact position determination.

DE 10 2012 025 326 A1 discloses a method for operating a transport device in the form of a long-stator linear motor. A desired movement pattern for a carriage along a movement path is predetermined via a higher-level control device. The transport device has distance measuring systems to determine the position of the carriage. The higher-level control device assigns a specific sequence program to each carriage. There is no description of a dynamic sequence of movements and its effect on the carriages or the goods being conveyed.

Usually the planning of the movement pattern of the transport unit(s) takes place along a predetermined transport path and, for example, as a function of a predetermined or desired time sequence of a production process, for example by establishing a speed profile of the transport unit along the transport path. This is also referred to as one-dimensional planning in the direction of movement along the predetermined transport path, i.e. only the position or the distance covered by the transport unit in the direction of movement is relevant, not the spatial geometry of the transport path (curves, etc.). For example, work stations which are passed by the transport unit in a specific time sequence can be arranged along the transport path, for example in order to process an object transported by the transport unit. This can involve, for example, filling bottles or containers with a certain substance, a painting process, an assembly step or mechanical processing, etc. Depending on the requirements, the movement pattern can be a continuous movement profile, e.g. a constant speed over the transport path or also a cyclical predetermined movement profile in which, for example, the transport unit stays in a work station for a certain time. Along the transport path there can also be sections with predetermined kinematic limits that must not be breached by a transport unit, for example a maximum speed in a curve, in order not to exceed a maximum centrifugal force, or a maximum acceleration. The kinematic limits therefore generally limit the maximum movement variables to be predetermined for the transport unit in order to ensure that a planned movement profile can actually be realized by the transport unit.

The determination of the movement profile of a transport unit takes place for a predetermined to point of the transport unit, for example for a defined shuttle center point, in the direction of movement along the transport path. Since the object transported by the transport unit is usually rigidly connected to the transport unit, the movement of the object is also planned.

However, this type of planning of the movement profile of the transport unit can lead to problems in some applications. This is the case, for example, if the movement causes the object on the transport unit to experience different kinematic conditions than the point on the transport unit for which the movement was planned. For example, the object could not be arranged centrally or in a certain geometrical relation on the transport unit, so that the object experiences different centrifugal forces, accelerations, speeds in a curve than the point for which the movement was planned. This can be a problem in particular when the transport unit is used to transport sensitive goods, for example chemicals, hot liquids, etc. and/or if devices or tools by which certain actions are to be carried out are arranged on the transport unit. In such cases, even if the kinematic limits for the shuttle center point of the transport unit are adhered to, critical movement states of a certain reference point moved with the transport unit can occur, which is disadvantageous. The reverse variant can also be disadvantageous, namely when the movement profile for the shuttle center point is planned in compliance with kinematic limits of the transport unit, but the forces acting on the transport unit change due to a movement of the object during the movement of the transport unit.

It is therefore an object of the invention to provide a method for controlling a transport unit of a transport device in the form of a long-stator linear motor, by which it can be ensured that predetermined movement states are adhered to for an object that is moved with the transport unit.

According to the invention, the object is achieved in that for the control unit a relative movement profile is predetermined for a relative point connected to the transport unit and spaced from the reference point of the transport unit with a known relative position relative to the reference point of the transport unit at least in sections along the transport path, and in that the control unit determines the movement profile of the transport unit from the relative movement profile of the relative point, wherein the relative point is rigidly connected to the transport unit or a coupling device comprising the relative point is provided on the transport unit, the coupling device comprising kinematics with at least one degree of freedom of movement for the relative point. In this way planning of the movement pattern of the transport unit takes account of the fact that the movement variables of the transport unit and of an object arranged on the transport unit can differ, which can be the case in particular in curves in which the relative point can, for example, have a higher circumferential speed than the reference point of the transport unit. The movement profile of the transport unit can either be newly determined as a function of a movement profile of the relative point or can be adapted accordingly.

The relative position of the relative point in space relative to the reference point of the transport unit is preferably changed by the kinematics during the movement of the transport unit. This makes it possible that the relative point, which is arranged on an object, for example, is spatially changed during the movement of the transport unit and the movement profile of the transport unit is adapted to the changed relative distance. This can be planned offline, for example, if the movement sequence of the reference point is known, but it could also be planned online in real time during the movement of the transport unit. As a result, rigid or flexible constructions which have the relative point can be arranged on the transport unit, and the relative point which is arranged on an object, for example, can change its position during the movement of the transport unit.

It is advantageous if at least one holding element for holding an object is preferably arranged on the coupling device, the relative point being provided on the holding element or on the object. Objects such as parts to be processed, assembled or transported can thus be held and the relative point on the object can be established. The movement profile of the transport unit can then be established as a function of the relative point of the object held on the holding element.

A path-time profile or a time derivative thereof is preferably provided as the movement profile of the transport unit and/or as the movement profile of the relative point. In this way, for example, a profile of the speed, the jerk or the jounce of the transport unit and/or of the relative point can also be used.

Advantageously, at least one transport unit target value is predetermined for the reference point of the transport unit, the movement profile being established in such a way that the transport unit target value is adhered to. The transport unit target value is preferably a maximum transport unit speed and/or a maximum transport unit acceleration of the reference point in the direction of movement of the transport unit and/or transversely thereto and/or a maximum force acting on the transport unit, preferably a maximum centrifugal force, and/or a maximum torque and/or a predetermined transport unit distance of the reference point of the transport unit from a second reference point of a second transport unit in the direction of movement or in space. In this way, inadmissibly high loads acting on the transport unit can be avoided and, for example, predetermined distances from transport units moving in front of or behind the transport unit can be adhered to.

At least one relative point target value is advantageously also established for the relative point, the movement profile of the transport unit being established such that the relative point target value is adhered to. A maximum speed and/or a maximum acceleration of the relative point and/or a maximum relative point centrifugal force is preferably established as the relative point target value and/or a predetermined reference distance from a movable or fixed reference point in space is established, wherein a second relative point or a second reference point of a second transport unit is preferably used as the movable reference point. As a result, inadmissibly high loads acting on the relative point, e.g. on an object, can be reliably avoided and distances between relative points of several transport units moving on the transport path can be adhered to, for example a constant distance between two objects of two transport units moving one behind the other.

According to a further preferred embodiment, a relative force acting between the relative point of the transport unit and a second relative point of a second transport unit is predetermined as the relative point target value of the relative point of the transport unit, and the movement profile of the transport unit and/or the movement profile of the second transport unit is established so that the relative force acting between the relative points is adhered to. This makes it possible, for example, to exert a specific predetermined force on an object moved by the second transport unit with an object arranged on the transport unit.

The object is also achieved with a transport device of the type referred to in the introduction, wherein a relative point connected to the transport unit and spaced from the reference point of the transport unit with a known relative position relative to the reference point of the transport unit is provided on the transport unit, wherein a relative movement profile of the relative point in the control unit is predetermined at least in sections along the transport path and wherein the control unit is configured to determine the movement profile of the transport unit from the relative movement profile of the relative point, wherein the relative point is rigidly connected to the transport unit or a coupling device having the relative point is provided on the transport unit which has kinematics having at least one degree of freedom of movement for the relative point.

Figure 2:
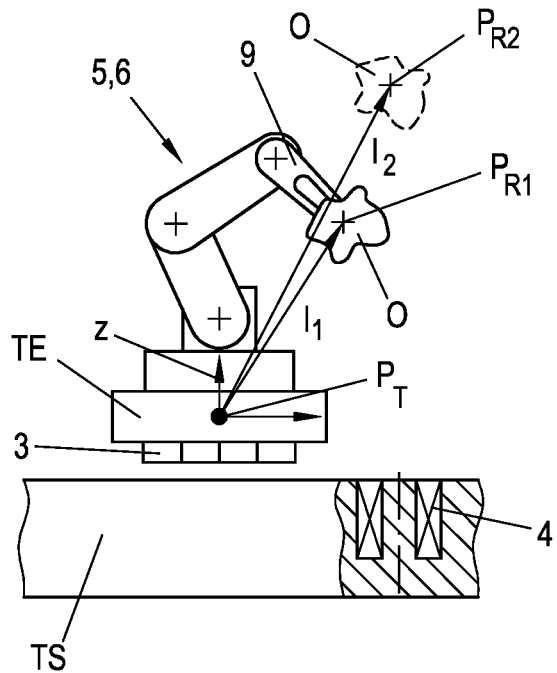
Figure 3:
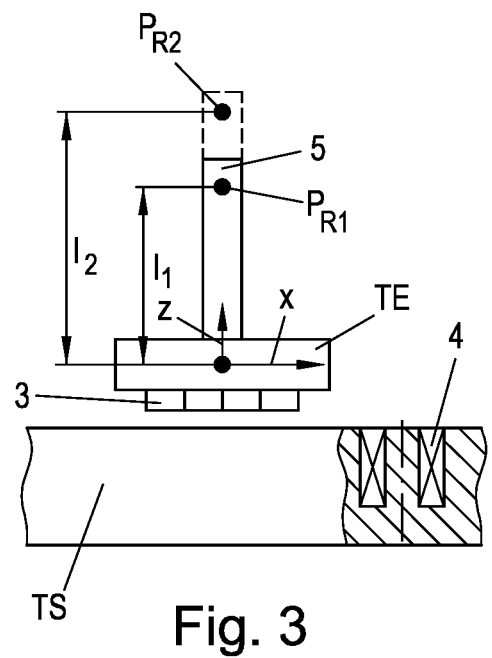
Figure 4:
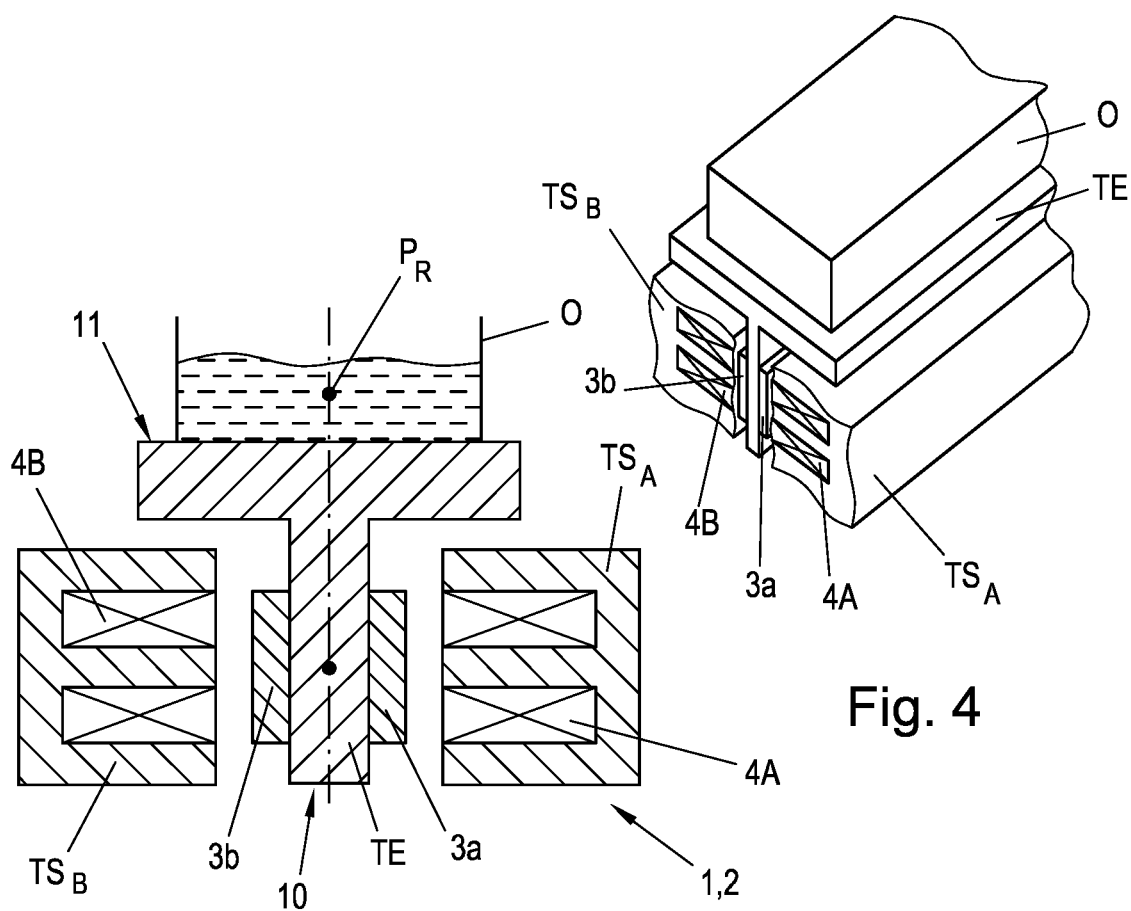
Figure 5:
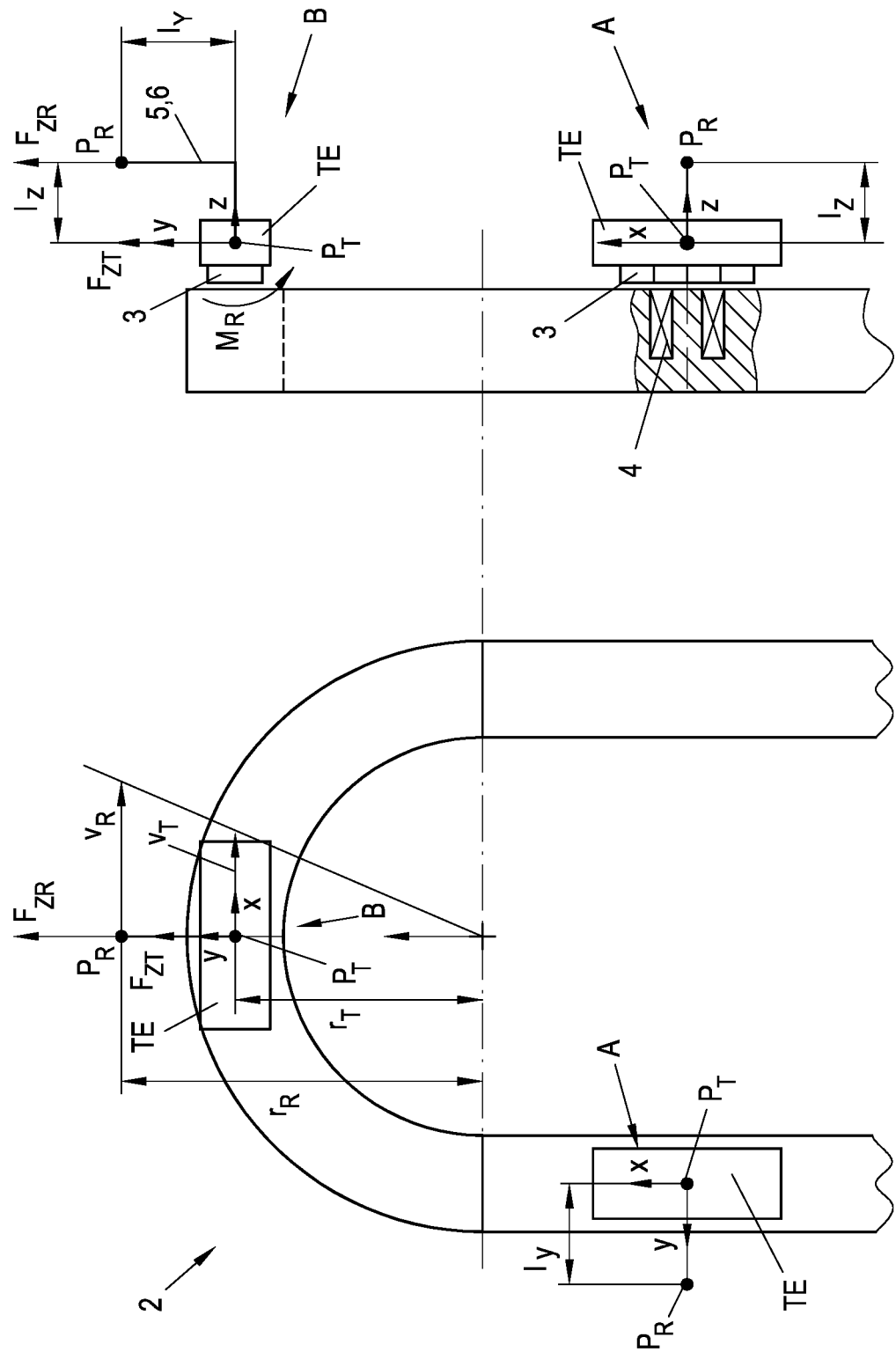
Figure 6:
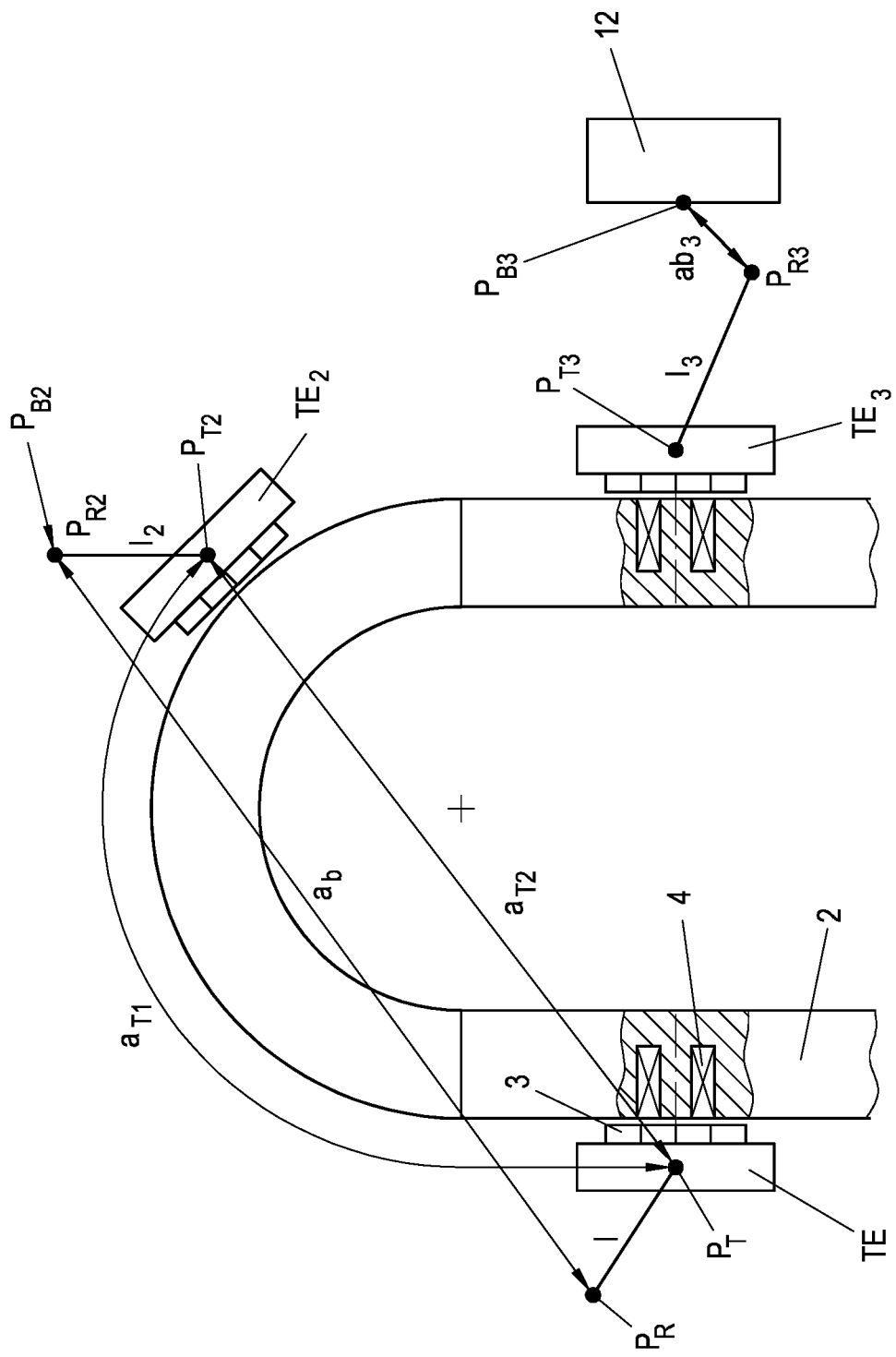

In the following, the present invention is described in greater detail with reference to FIGS. 1 to 6 which, by way of example, show schematic and non-limiting advantageous embodiments of the invention. In the figures:

FIG. 1 shows a transport device according to the invention in the form of a long-stator linear motor with speed profiles of the reference and relative point, FIG. 2 shows a transport unit with a rigid coupling device, FIG. 3 shows a transport unit with a coupling device in the form of a robot, FIG. 4 shows a transport device in double comb design in a sectional view and an isometric view, FIG. 5 shows a transport device according to the invention with the balance of forces on the transport unit in a top view and a side view, FIG. 6 shows a section of a transport path with several transport units.

FIG. 1 shows the basic structure of a transport device 1 in the form of a long-stator linear motor with a transport unit TE which can be moved in the direction of movement along a transport path 2. In a known manner, drive magnets 3 are arranged on the transport unit TE and drive coils 4 are arranged on the transport path. The drive coils 4 are arranged at a distance from one another in the longitudinal direction (direction of movement of the transport unit TE) on the transport path 2 and are generally controlled by a common control unit 7 in order to generate a moving magnetic field. This is done, for example, by impressing a coil current in the drive coils 4 by applying a coil voltage to the drive coils 4. Appropriate control generates a moving magnetic field in the longitudinal direction which interacts with the drive magnets 3 of the transport unit TE to generate a propulsive force acting on the transport unit. The transport path 2 can also be assembled from several transport segments TS, for example straight line segments or curve segments, in order to achieve a desired transport path. Of course, this is only to be understood as an example; there could also be differently configured transport segments TS, for example curve entry segments whose curvature increases continuously from a curvature=infinite (corresponds to a straight line segment) to a predetermined curvature.

A transport path could, however, also have other conveyor devices, such as continuous conveyors, which convey the transport unit TE, for example, to a higher or lower level. A plurality of transport sections could also be connected to one another by switches in order to steer a transport unit either onto one or onto another transport section according to the switch position. A plurality of control units 7 can also be arranged, for example one control unit 7 for each transport segment TS, which can be connected by a higher-level overall control unit (not shown). Guides (not shown) can also be arranged on the transport path 2 and/or on the transport units TE, which guides reliably guide the transport unit TE along the transport path 2 so that the transport unit TE cannot fall off the transport path 2. The structural design of the guides can take the form of rollers or other suitable guide elements, for example.

In the control unit 7 (hardware and/or software), a controller unit 8 (hardware and/or software) is usually arranged, which can be implemented, for example, in the form of a suitable controller. The controller unit 8 adjusts, for example, a predetermined movement profile of the transport unit TE, which is defined, for example, by a specific process sequence. For this purpose, the controller unit 8 receives setpoint values for a transport unit TE, such as a setpoint position or a setpoint speed, in each time step of the control, from which the controller calculates corresponding manipulated variables, such as a coil current or a coil voltage of the drive coils 4 involved in the movement. For this purpose, the controller unit 8 can of course also have actual values from the transport unit TE, such as an actual position or an actual speed. The actual values can, for example, be measured with position sensors along the transport path. The setpoint values for controlling the movement are obtained from the predetermined planned movement profile for the transport unit TE.

In the simplest case, the movement profile of the transport unit TE can be derived from a specific target position of the transport unit TE along the transport path 2, which is to be reached by the transport unit TE at a specific point in time. For example, a distance-time profile or a speed-time profile can be calculated from this as a movement profile. The transport path 2 can also be divided into sections, wherein a separate movement profile can be predetermined for each section. Such profiles can also be predetermined directly, for example by a higher-level system control unit, or also externally, for example if the movement of the transport unit is to be synchronized with an external movement, e.g. a movement of a processing or manipulation unit (such as a robot) of a work station. When the movement profile is determined or predetermined, predetermined dynamic limits, such as a maximum acceleration or a maximum jerk (temporal derivation of the acceleration), can of course also be taken into account.

Depending on the size and structural design of the transport device 1, there are certain dynamic transport unit limit values which cannot or must not be exceeded by the transport unit TE. For example, this can be a maximum speed $v_{Tmax}$ of the transport unit TE which is determined, for example, by a maximum coil current, a maximum coil voltage or other physical limits. Such dynamic transport unit limit values are to be taken into account during planning of the movement profile of the transport unit TE, preferably in the form of predetermined transport unit target values, as will be explained in detail later. On curve segments, however, a maximum transport unit centrifugal acceleration $a_{ZTmax}=r*\omega^2$ or a maximum transport unit centrifugal force $F_{ZTmax}=m*r*\omega^2$ with a transport mass m, a curve radius r and an angular speed w can be used as the decisive dynamic transport unit limit value in order not to let the forces acting on the transport unit TE become inadmissibly high. A maximum speed $v_{Tmax}$ of the transport unit TE on the curve segment can be calculated from this using the relationship v=ω*r. The mass of the transport unit TE can be used alone as the transport mass m or a total transport mass m resulting from the sum of the mass m TE of the transport unit TE and a mass $m_O$ of an object O transported by the transport unit TE can be used. If the mass $m_O$ of the object is sufficiently low, this can also be ignored with only the mass m TE of the transport unit TE being taken into account.

If an object O is transported by the transport unit TE, which is usually the case, the transport unit TE preferably also has a coupling device 5 with a holding element 9 for holding the object O, as is shown by way of example in FIG. 2, wherein the coupling device 5 in FIG. 2 is to designed as kinematics 6 (such as, for example, a robot) with a plurality of degrees of freedom of movement (in the form of serial or parallel kinematics). In this case, the mass m K of the coupling device 5 would also have to be added to the transport mass m if this latter cannot be ignored in relation to the remaining masses.

The movement profile of the transport unit TE is usually predetermined for a specific reference point $P_T$ of the transport unit TE, for example for a shuttle center point, such as a center of gravity or center point. The design of the transport device 1 and thus also of the transport unit TE can, however, be varied. For example, the transport unit TE can have a substantially cuboid base body 11, as shown schematically in FIG. 1. The transport device 1 could, however, also be constructed as shown in FIG. 4 on the basis of a cross section of the transport device 1.

The variant of the transport unit in FIG. 4 (on the left in a sectional illustration, on the right in an isometric view) comprises a base body 11 on which drive magnets 3a, 3b are arranged on both sides. In this exemplary embodiment, the base body 11 is T-shaped and the drive magnets 3a, 3b are arranged on the leg 10. The drive magnets 3a, 3b interact in a known manner with drive coils 4a, 4b, which are arranged on parts of the transport path 2, such as transport segments $TS_A$, $TS_B$, provided on both sides of the leg 10 of the transport unit TE. It can be seen from this that the transport unit TE can extend to different lengths in different directions, depending on the design. Accordingly, the reference point $P_T$ of the transport unit TE, which is used to establish the movement profile of the transport unit TE, cannot be defined in a generally valid manner, but also depends on the structural design of the transport unit TE. In the example according to FIG. 1, the reference point $P_T$ is, for example, the center point of the substantially cuboid base body 11 of the transport unit TE. In the exemplary embodiment according to FIG. 4, the reference point is selected, for example, on the leg 10, centrally between the drive magnets 3a, 3b. The movement profile of the transport unit TE is usually planned for this reference point $P_T$.

In some applications of the transport device 1, in which, for example, sensitive objects O such as containers with liquids, chemicals, etc. are transported or the object O occupies a certain position in relation to the transport unit TE, it may be desired that a certain fixed relative point $P_R$ that moves with the transport unit TE does not exceed certain dynamic relative point limit values. By analogy with the dynamic transport unit limit values of the transport unit TE, this may be, for example, a maximum relative point speed $v_{Rmax}$, a maximum relative point acceleration $a_{Rmax}$, a maximum relative point centrifugal force $F_{ZRmax}$, etc. The relative point $P_R$ can lie on the object O, but can also be another point of interest. In order not to exceed the dynamic limit values of the transport unit TE, at least one so-called to transport unit target value is preferably predetermined for the reference point $P_T$ of the transport unit TE and the movement profile of the transport unit TE is established so that the transport unit target value is not exceeded. Analogously to this, a relative point target value can also be established for the relative point $P_R$ in order not to exceed certain dynamic relative point limit values and the movement profile of the transport unit TE is established so that the relative point target value is adhered to. Of course, it is also conceivable that one or more reference point target values or relative point target values are established both for the reference point $P_T$ and also for the relative point $P_R$.

Since the object O transported by the transport unit TE is usually arranged on the base body 11 of the transport unit TE or, as described, is held by a holding element 9 of a coupling device 5 arranged on the base body 11, the relative point $P_R$ is often spaced apart from the transport unit TE at a spatial relative distance I from the reference point $P_T$, as shown in FIG. 1. However, this relative distance I is not necessarily constant, but can also change during the movement of the transport unit TE, for example if the reference point $P_T$ is coupled to the transport unit TE by kinematics 6. Depending on the position of the relative point $P_R$ in space, the relative distance I can be broken down into components, e.g. on a coordinate system moved with the transport unit TE with a movement axis X in the direction of movement of the transport unit and a normal transverse axis Y and a vertical axis Z, as shown in FIG. 5. If the movement profile of the transport unit TE is now established in a conventional manner, for example while adhering to a predetermined transport unit target value for the reference point $P_T$ of the transport unit TE (e.g. a maximum transport unit speed $v_{Tmax}$ as a dynamic transport unit limit value), it can, in particular on curve segments, lead to a situation where, with this movement profile, maximum permissible dynamic relative point limit values of the relative point $P_R$ are exceeded (for example a maximum relative point speed $v_{Rmax}$, as explained in more detail with reference to the speed profiles in FIG. 1.

The speed profiles for the reference point $P_T$ of the transport unit TE and for the relative point $P_R$ along the transport path 2 are shown above the transport device 1 or radially outside respectively. In the example shown, only the relative point $P_R$ is shown without object O or coupling device 5 for reasons of clarity. In the example shown, a constant speed profile $v_T$ of the reference point $P_T$ of the transport unit TE along the transport path 2 is predetermined as the movement profile of the transport unit TE, preferably while adhering to the dynamic transport unit limit values in the form of a predetermined transport unit target value. It can be seen that the speed $v_T$ on the straight line segment is the same as on the curve segment. On the curve segment (which is designed here as a circular arc) the speed $v_T$ of the reference point $P_T$ of the transport unit TE corresponds to a circumferential speed of a circle with a center point $P_M$ and a reference radius $r_T$, as shown in FIG. 1.

The relative point $P_R$ lies radially further out here, distanced at a relative radius $r_R$ from the circle center $P_M$. The absolute value of the difference between the reference radius $r_T$ and the relative radius $r_R$ corresponds to the relative distance I (the absolute value resulting from the fact that the relative point $P_R$ could also be located radially further inward than the reference point $P_T$). The angular speed w can be calculated from the relationship $v_T = \omega * r_T$. Because the relative point $P_R$ is firmly connected here to the transport unit TE, the relative point $P_R$ also rotates at the same angular speed w as the reference point $P_T$ of the transport unit TE. Consequently, the (circumferential) speed $v_R$ for the relative point $P_R$ is obtained from the relationship $v_R = \omega * r_R$. As can be seen from the speed profile of the relative point $P_R$, the speed $v_{PR}$ of the relative point $P_R$ on the straight line segment is equal to the speed $v_T$ of the reference point of the transport unit TE. Due to the rotary movement of the transport unit TE on the curve segment, the (circumferential) speed $v_R$ (dashed line in FIG. 1) of the relative point $P_R$ on the curve segment is greater than the (circumferential) speed (solid line in FIG. 1) of the reference point $P_T$. To illustrate this, a jump in the relative point speed $v_R$ is shown at the transition from the straight line segment to the curve segment. The jump results from the sudden change in the curvature from the straight line segment (curvature=infinite) to the curve segment (curvature=dependent on the curve radius). Such a jump is of course not possible in reality because it would require a substantially infinitely high acceleration. The acceleration a T of the transport unit TE is limited, as described, by the physically determined dynamic transport unit limit values of the transport unit TE.

The movement profile of the transport unit TE is therefore preferably already established by specifying one (or more) transport unit target values so that the dynamic transport unit limit values are not reached or not exceeded. In order, for example, to achieve a uniform speed profile, it is also possible to use the aforementioned curve entry segment, the curvature of which increases continuously from infinity to a predetermined curvature of the curve segment. From the above relationship (relative point (circumferential) speed $v_R$>reference point (circumferential) speed $v_T$ on the curve segment), it can be seen that even if predetermined transport unit target values such as dynamic transport unit limit values of the reference point $P_T$ (for example a maximum reference point (circumferential) speed v T) are adhered to, the relative point (circumferential) speed $v_R$ is higher than the reference point (circumferential) speed $v_T$, which may be undesirable. In any case, a permissible limit speed for the relative point $P_R$ could thus be exceeded under certain circumstances, although the movement profile of the transport unit TE adheres to all the predetermined dynamic transport unit limit values due to the predetermination of transport unit target values.

According to the invention, the movement profile of the transport unit TE is therefore established at least in sections along the transport path 2 as a function of a relative movement profile of the relative point $P_R$ connected to the transport unit TE and spaced from the reference point $P_T$ of the transport unit TE at a relative distance I. "Connected" means that the relative point $P_R$ is moved with the transport unit TE, but that a relative movement between the relative point $P_R$ and the transport unit TE is still possible, for example if a kinematic 6 is arranged on the transport unit TE with which the relative point $P_R$ is moved in space relative to the reference point $P_T$ of the transport unit TE. "In sections" can mean, for example, that this is only done on critical sections such as curve sections. Since an object O is usually transported with the transport unit TE, in such critical sections the focus when planning the movement profile can be placed on the object O and not on the transport unit TE. In particular in the case of large masses to be transported and/or large relative distances I, it is advantageous to define the relative movement profile instead of defining the movement profile of the transport unit TE. It is also advantageous if the relative point $P_R$ is moved relative to the transport unit TE during the movement of the transport unit TE and the relative distance I changes, for example.

When the relative movement profile of the relative point $P_R$ is established, the known geometric relationships can be used to convert the movement profile of the reference point $P_T$ on the transport unit TE, which can be done, for example, in the control unit 7. In this way, an already planned movement profile of the transport unit TE can also be changed in order to realize the desired relative movement profile of the relative point $P_R$. In the case of known, predetermined process sequences and in particular with (during the movement) fixed relative distances I, the relative movement profile over the entire transport path 2 or in the intended sections of the transport path 2 is known, and thus the movement profile of the reference point $P_T$ of the transport unit TE is also known. This does not change anything for the control of the movement of the transport unit TE, since the movement profile of the reference point $P_T$ on the transport unit TE can always be used for control. In the course of controlling the movement profile of the reference point $P_T$, it is usually necessary to determine the actual position of the reference point $P_T$ such as the shuttle center point. This actual position of the reference point $P_T$ is generally not measured directly, but calculated. For this purpose, for example, an actual position of the transport unit TE can be measured by position sensors along the transport path 2 and can be converted via known geometric relationships of the transport unit TE to an actual position of the reference point $P_T$. It is then possible to convert from the actual position of the reference point $P_T$ to an actual position of the relative point $P_R$. If the installation position and location of the position sensors is known, two-dimensional or three-dimensional information for planning the movement profile and/or the relative movement profile can be generated, for example.

However, it is advantageous if the transition between the planned movement profile of the transport unit TE and the movement profile of the transport unit TE calculated on the basis of the relative movement profile of the relative point $P_R$ is implemented as a kinematically favorable transition. This is done, for example, without jumps in the acceleration or in the jerk.

According to a further embodiment of the method according to the invention, the relative distance I of the relative point $P_R$ from the reference point $P_T$ does not have to be constant, but can be variable during the movement of the transport unit TE. The relative point $P_R$ can be changed, for example, only in one direction, as shown in FIG. 3, or the relative point $P_R$ can be changed in several dimensions, as shown in FIG. 2, FIG. 5 and FIG. 6. In the embodiment according to FIG. 3, a coupling device 5, which comprises the relative point $P_R$, is arranged on the transport unit TE. The length of the coupling device 5 can be changed so that the relative distance I changes, in the example shown in a movement axis from a relative distance $I_1$ to a relative distance $I_2$ in the Z-direction and vice versa. The adjustment of the relative distance I can take place in steps or continuously.

Of course, the relative point $P_R$ in FIG. 3 could also be arranged on a holding element 9 (not shown) or an object O. For example, a constant speed $v_R$ over the entire transport section 2 could again be established as the relative movement profile of the relative point $P_R$. Consequently, in order to ensure this, the speed $v_T$ of the reference point $P_T$ of the transport unit TE on the curve segment would have to be reduced and/or the relative distance I would have to be reduced. If, for example, the relative distance I on the curve segment is increased, the speed $v_T$ of the reference point $P_T$ would have to be reduced further accordingly in order to adhere to the boundary condition of the constant relative point speed $v_R$.

In FIG. 2, the coupling device 5 is designed as multi-axis kinematics 6, which is arranged on the transport unit TE. A holding element 9 for holding an object O is arranged on the kinematics 6, the relative point $P_R$ being arranged on the object O. The kinematics 6 can move the object O substantially in any space in relation to a coordinate system that is stationary with the transport unit TE, as is symbolized here by the dashed object O. In the example shown, the relative distance I of the relative point $P_R$ arranged on the object O is changed, for example, from a first relative distance $I_1$ of the relative point $P_{R1}$ to a second relative distance $I_2$ of the second relative point $P_{R2}$ in the illustrated X-Z plane.

This movement of the relative point $P_R$, based on the transport unit TE, which is known, can of course be converted into a relative movement profile of the relative point $P_R$ based on the known geometric relationships, for example by means of a known backward transformation similar to a robot. This can again be limited with the predetermined dynamic relative point limit values for the relative point $P_R$ by predetermining relative point target values, wherein different directions can also be taken into account for this purpose. For example, a speed component in the direction of movement (X) and transverse to it (Y, Z) can be taken into account. The relative movement profile of the relative point $P_R$ limited in this way can then be converted again to the movement profile of the reference point $P_T$ of the transport unit TE. These conversions can take place in the control unit 7 or also in a higher-level plant control unit. Of course, this applies not only to the X-Z plane shown, but also, for example, for a movement of the relative point $P_R$ normal to the plane shown, that is to say for example for a curve that extends substantially out of the X-Z plane shown.

In the case of the coupling of the relative point $P_R$ to the transport unit TE by means of a kinematics 6, it can be assumed that the movement of the kinematics 6 is controlled by a kinematics control unit in which the current position of any part, for example a holding element 9, is known or can be determined. It can thus be assumed at any point in time that the current position of the relative point $P_R$ is known or can be determined, from which the movement of the relative point $P_R$ in relation to the transport unit TE can also be determined. The current position of the relative point $P_R$ and/or the movement of the relative point $P_R$ relative to the transport unit TE can thus also be transmitted to the control unit 7 and/or to a plant control unit.

FIG. 5 shows a further example of a transport device 1 with a transport unit TE with a reference point $P_T$, which is moved along a transport path 2. In contrast to the embodiment in FIG. 1, the transport unit TE is moved here in a common plane of movement along the entire transport path 2. The drive coils 4 are also arranged accordingly in order to interact with the drive magnets 3 of the transport unit TE. The design of the transport device 1 is of no importance for the invention. A relative point $P_R$ connected to the transport unit TE is arranged on the transport unit TE. As already described, the relative point $P_R$ can be at a fixed relative distance I from the reference point $P_T$ of the transport unit TE, which remains constant during the movement of the transport unit TE. The relative position of the relative point $P_R$ relative to the reference point $P_T$ of the transport unit TE then does not change during the movement of the transport unit TE.

The relative point $P_R$ can, however, also be movable during the movement of the transport unit TE, for example when it is arranged on a kinematics 6, wherein the relative position of the relative point $P_R$ in space changes relative to the reference point $P_T$ during the movement of the transport unit TE. The relative distance I or the relative position is known and is determined, for example, by the kinematics control unit or a suitable measuring device. In the example shown, the relative point $P_R$ is at a relative distance I with components $I_Y$ and $I_Z$ in the two coordinate axes Y and Z from the reference point $P_R$, the reference point $P_T$ of the transport unit TE being established as the origin of the coordinates. In principle, any desired reference coordinate system can be used, for example a fixed coordinate system of the transport path 2 or, as here, a coordinate system that moves with the transport unit TE. The transport unit TE is shown in a first position A on the straight line segment and in a later second position B on the curve segment.

The second position B is intended to illustrate how the position of the relative point $P_R$ affects the relative movement profile of the relative point $P_R$ and consequently the movement profile of the transport unit TE. It does not matter whether the relative distance I in the illustrated second position B is a snapshot of a relative point $P_R$ moved during the movement of the transport unit TE, or whether the relative distance is fixed, i.e. constant during the movement of the transport unit TE. If the transport unit TE is moved at a transport unit speed $v_T$, the relative point $P_R$, as already described, due to the relationship of the common angular speed ω experiences a higher relative point speed $v_R$ in case of a rigid coupling to the transport unit TE, e.g. by means of a rigid coupling device 5 (shown schematically in FIG. 5). If the relative point $P_R$ is arranged on a movable kinematics 6, for example on a robot, other speed ratios could also result, for example if the kinematics 6 moves the relative point $P_R$ in or against the direction of movement of the transport unit TE or transversely thereto relative to the reference point $P_T$. The speed $v_R$ of the relative point $P_R$ would then increase or decrease, depending on the speed generated by the kinematics 6. In the example shown, in the second position B on the curve segment a transport unit centrifugal force $F_{ZT}=m_T*r_T*\omega^2$ acts on the transport unit TE at the reference point $P_T$ and a relative point centrifugal force $F_{ZR}=m_R*r_R*\omega^2$ acts on the relative point $P_R$ (for example on an object O, not shown) with a transport unit mass m T and a relative point mass m R (for example, an object mass $m_O$ of an object O). The difference between the reference point radius r T and the relative point radius $r_R$ corresponds to the Y component $I_Y$ of the relative distance I. If the mass m K of the coupling device 5 cannot be ignored, the centrifugal force $F_{ZK}$ of the coupling device 5 should also be taken into account, which in a simplified manner acts, for example, in a center of gravity of the coupling device 5. In the case of movable kinematics 6, it may be necessary, for example, to take into account a centrifugal force $F_{Zi}$ for individual components of kinematics 6 that are moved relative to one another. In the simplified example according to FIG. 5, however, the mass $m_K$ of the coupling device 5 has been ignored. Due to the arrangement of the coupling device 5 on the transport device TE, the reaction forces that arise, for example, through a movement of a coupling device 5 designed as kinematics 6, must be absorbed by the transport unit TE. This means that, in the second position B, a sum of the transport unit centrifugal force $F_{ZT}$ and the relative point centrifugal force $F_{ZR}$ acts on the transport unit TE. This total centrifugal force $F_{Z\Sigma}$ must be absorbed, for example, by a guide (not shown) arranged on the transport path 2. In general, the following applies to the total centrifugal force $F_{Z\Sigma}=F_{Zi}$ with the individual centrifugal forces $F_Z=m_i*r_i*\omega_i^2$ of the components involved (e.g. object O, coupling device 5) to be taken into account.

In the example in FIG. 5, the relative point $P_R$ is at a relative distance I with the component $I_Z$ in the Z direction from the reference point $P_T$ (rigid or variable). In the second position B of the relative point centrifugal force $F_{ZR}$ this component $I_Z$ also exerts a torque $M_T=F_{ZR}*I_Z$ on the transport unit TE, which torque must be supported by the transport unit TE and, for example, must be absorbed by the guide. As a rule, however, the guide can only absorb limited forces, which is why it is advantageous to limit the forces acting on the transport unit TE during the movement. For this purpose, it is possible in turn to establish transport unit target values which should be adhered to or in particular must not be exceeded. These transport unit target values can be, for example, dynamic limit values such as a reference point maximum speed $v_{Tmax}$, a reference point maximum speed $a_{Tmax}$ in the direction of movement (here in the X direction) of the transport unit TE and/or transversely thereto (here for example in the Y direction or in the Z direction), a maximum transport unit centrifugal force $F_{ZT\ max}$ or a maximum torque $M_{Tmax}$, which are stored in the control unit 7, for example. However, the transport unit target values do not necessarily have to be maximum permissible limit values, but can also be any established target values that can be lower than the maximum permissible limit values. The control unit 7 then checks during the movement of the transport unit TE, for example in each time step of the control, whether the required transport unit target values are being adhered to, and if necessary, adjusts the movement variables of the transport unit TE, such as the transport unit speed $v_T$. This is done by back-calculation from a relative movement profile of the relative point $P_R$ to the movement profile of the reference point $P_T$ of the transport unit TE. If the individual masses $m_T$, $m_R$, ... $m_i$ are known, the forces and torques can be calculated with the said physical relationships and the known relative distance I. With unknown masses $m_i$, the forces (generally $F_i$) and torques (generally $M_i$) could also be recorded by suitable measuring devices, for example by strain gauges.

However, it may be that not only the transport unit TE has to adhere to certain predetermined transport unit target values such as dynamic transport unit limit values, but that there are also relative point target values to which the relative point $P_R$ has to adhere, for example dynamic relative point limit values which the relative point $P_R$ must not or should not exceed, for example when sensitive objects O are transported or for other reasons. As an alternative or in addition to the transport unit target values, specific relative point target values, for example a maximum speed $v_{Rmax}$, a maximum acceleration $a_{Rmax}$ of the relative point $P_R$ or a maximum relative point centrifugal force $F_{ZRmax}$, can then be predetermined for the control unit 7. This is particularly advantageous if, despite adhering to the transport unit target values such as the dynamic transport unit limit values, for example, unacceptably high forces would act on an object O in the relative point $P_R$. The permissible relative movement profile is converted by the control unit 7 via the known relationships to the movement profile of the transport unit TE and is then adapted by the control unit 7 so that the relative point target values are adhered to. This can mean, for example, that the transport unit TE is moved with significantly smaller movement variables than the dynamic transport unit limit values would allow.

However, it may also be that the relative movement profile and consequently also the movement profile of the reference point $P_T$ of the transport unit TE cannot be planned in advance for the entire transport path 2, for example when the movement of the relative point $P_R$ relative to the transport unit TE is not known beforehand. In this case it would be conceivable, for example, to use a numerical control method for the transport unit TE in which the movement variables for the relative point $P_R$ and, consequently, for the reference point $P_T$ are only calculated for the next time step of control. This can be carried out, for example, by a suitable controller which can be integrated into the controller unit 8 of the control unit 7, for example. Such methods are known in the art, for which reason they are not discussed in greater detail at this point.

FIG. 6 shows another example of a transport device 1 in which three transport units TE, $TE_2$, $TE_3$ are moved on the transport path 2. Each transport unit TE, $TE_2$, $TE_3$ has a relative point $P_R$, $P_{R2}$, $P_{R3}$ which is connected to the relevant transport unit TE, $TE_2$, $TE_3$. The connection can again be fixed, so that the relative distance $I_i$ between the relative point $P_R$, and the reference point $P_T$, does not change during the movement of the transport units $TE_i$, or the relative distance $I_i$ can be variable, for example when arranged on a movable kinematics 6 (not shown) (the index i relates to the transport units TE-$TE_3$). The transport units TE-$TE_3$ can be moved along the transport path 2, the direction of movement being predetermined by the design of the transport path 2. Of course, the movement of the relative points $P_R$, can also take place three-dimensionally and is not limited to the plane of the drawing shown.

According to the invention it is possible to predetermine, as transport unit target values, not only dynamic transport unit limit values, such as a maximum transport unit speed $v_{Tmax}$ or a maximum transport unit centrifugal force $F_{ZTmax}$, but also substantially static transport unit target values that are to be adhered to by the transport unit TE. For example, a transport unit distance an in the direction of movement along the transport path 2 between the transport unit TE and the second transport unit $TE_2$ traveling in front of it could be predetermined, and must be adhered to in sections or over the entire transport path 2 during the movement of the transport units TE, $TE_2$. The transport unit distance an can, for example, be predetermined for the control unit 7, and from this the control unit 7 calculates a corresponding movement profile for the particular transport unit $TE_i$. The transport unit distance a T does not necessarily have to be predetermined in the direction of movement, but could alternatively also be provided as a spatial transport unit distance $a_{T2}$, which can be useful, for example, with a three-dimensional shape of the transport path 2.

Analogously to this, it is possible not only to predetermine relative point target values in the form of dynamic limit values, such as a maximum speed $v_{Rmax}$ or a maximum relative point centrifugal force $F_{ZRmax}$, for the relative point $P_R$ of the transport unit TE, but also a predetermined reference distance $a_B$ from a movable or stationary reference point $P_B$ in space can be used as the relative point target value. A second relative point $P_{R2}$ or a second reference point $P_T2$ of a second transport unit TE 2 traveling in front of (or behind) the transport unit TE can be used as the movable reference point PB of the transport unit TE. This can be particularly useful if, for example, kinematics 6 are arranged on the transport units TEi and the relative points $P_{Ri}$ should be prevented from coming too close to one another or, in the worst case, colliding. By predetermination of transport unit target values and/or relative point target values, the movement profiles of a plurality of transport units $TE_i$ moving on the transport path 2 with relative points $P_{Ri}$ arranged thereon can be coordinated with one another.

For example, if two transport units TE, TE 2 with rigidly coupled relative points $P_R$, $P_{R2}$ (analogous to the embodiment in FIG. 1) are moved one behind the other on the transport path 2 according to FIG. 1, it may be desired that the relative points $P_R$, $P_{R2}$ have a constant distance in the direction of movement which, due to the rigid coupling, substantially corresponds to the direction of movement of the transport units TE with an offset of the relative distance I. On the straight line segment, for example, both transport units TE, $TE_2$ could be moved at a constant speed in order to keep the distance between the relative points $P_R$, $P_{R2}$ constant. If the transport unit $TE_2$ traveling in front is moved on the curve segment, when the constant speed is adhered to the distance between the relative points $P_R$, $P_{R2}$ would increase due to the rotational movement on the curve segment, which is undesirable in some circumstances. In this case, the speed of the rear transport unit TE could be increased and/or the speed of the transport unit TE 2 traveling in front could be reduced, or both, in order to maintain a constant distance between the relative points $P_R$, $P_{R2}$. The relevant transport unit target values and the relative point target values are advantageously adhered to. As a result, it could be, for example, that the transport unit TE traveling behind could not increase the speed any further because this would exceed established relative point target values of the relative point $P_R$. In this case it would be necessary for the transport unit $TE_2$ traveling in front to reduce the speed.

However, a fixed reference point $P_{B3}$ could also be established, from which the relative point $P_{R3}$ of the transport unit TE 3 has to maintain a predetermined reference distance $a_{B3}$. For example, the reference point $P_{B3}$, as shown in FIG. 6, could be arranged on a fixed structure 12 and the relative point $P_{R3}$ could be arranged on a kinematics 6 on the transport unit TE. When the transport unit $TE_3$ is moved past the fixed structure 12, the predetermined reference distance $a_{B3}$ is adhered to, for example in order to avoid a collision with the fixed structure 6. For this purpose, the relative movement profile of the relative point $P_{R3}$ is established accordingly, for example by reducing the relative distance $I_3$ between the relative point $P_{R3}$ and the reference point $P_{T3}$ in the region of the fixed structure 12, which in the case of kinematics 6 can be carried out by the kinematics control unit. For example, the movement profile of the transport unit $TE_3$ could be adapted in the region of the fixed structure 12, for example by reducing the transport unit speed $v_T$, in order to give the kinematics control unit sufficient time to control the kinematics 6 in order to reduce the relative distance $I_3$.

According to a further embodiment of the invention, a relative force $F_R$ can also be predetermined as the relative point target value of the relative point $P_R$ of the transport unit TE, which force F R should act between the relative point $P_R$ of the transport unit TE and a second relative point $P_{R2}$ of a second transport unit $TE_2$ (in front of or behind the transport unit TE). The movement profile of the transport unit TE and/or the movement profile of the second transport unit $TE_2$ is then established so that the relative force F R acting between the relative points $P_R$, $P_{R2}$ is adhered to. It would be conceivable, for example, that an object O is moved with the second transport unit $TE_2$, on which a certain component transported by the transport unit TE is to be assembled. To assemble the component on the object, a certain assembly force $F_M$ could be required, for example in order to press the component into an opening provided on the object O. The component to be pressed in is transported by the transport unit, which is moved behind the second transport unit TE 2 (or in front of it, depending on the design of the object, the arrangement of the opening and the process control). For example, the component can be arranged on a coupling device 5 on the transport unit TE by means of a suitable holding element 9. In this case, for example, the relative point $P_T$ of the transport unit would be arranged on the component and the second relative point $P_{T2}$ would be arranged on the object that is transported by the second transport unit $TE_2$, for example in the region of the opening.

In order to introduce the component into the opening of the object O, the movement profile of the transport unit TE is established in such a way that the transport unit TE first approaches the second transport unit $TE_2$ traveling in front of it and, when there is contact between the component and the object or the opening of the object, a defined relative force $F_R$ between component and object O is generated, which preferably corresponds to the assembly force $F_M$. Of course, the movement profile of the second transport unit $TE_2$ could also be established so that the second transport unit $TE_2$ is braked and as a result the distance to the transport unit TE behind it is reduced, or both movement profiles of both transport units TE, $TE_2$ can be adapted. If the component is arranged, for example, on a movable kinematics 6, a constant transport unit distance a T between the reference points $P_T$, $P_{T2}$ could also be predetermined as the transport unit target value, and the relative force F R as a predetermined relative point target value could be set by the kinematics 6, e.g. by the kinematics control unit. To generate the relative force $F_R$, for example, the propulsion force generated by the drive coils 4 and the drive magnets 3 of the transport unit TE and acting on the transport unit TE can be increased by increasing the coil current introduced into the drive coils 4.

It can be seen that a large number of combinations and possibilities for coordinating the relative movement profiles and movement profiles of several transport units TEi with one another are possible. To determine actual values of the transport unit distances at, and reference distances $a_{Bi}$, suitable measuring devices (not shown) can of course be provided on the transport device 1. Such measuring devices are known in the prior art and can be, for example, in the form of camera systems or known geometric relationships stored in the control unit 7 or the kinematics control unit.

The examples described are of course only to be understood as examples; the specific design of the transport device 1, the transport unit TE, the coupling device 5, etc. is left to the person skilled in the art and is not decisive for the invention. It is essential for the invention that the movement profile of the transport unit TE is established at least in sections based on a relative movement profile of a relative point $P_R$, for example a spatial relative movement profile.

The invention claimed is:

1. A method for controlling a transport unit of a transport device in the form of a long-stator linear motor in direction of movement along a transport path of the transport device, wherein a movement profile of the transport unit by which the transport unit is moved along the transport path is predetermined for a control unit for a defined reference point of the transport unit, characterized in that for the control unit a relative movement profile is predetermined for a relative point connected to the transport unit and spaced from the reference point of the transport unit with a known relative position relative to the reference point of the transport unit at least in sections along the transport path, and in that the control unit determines the movement profile of the transport unit from the relative movement profile of the relative point, wherein the relative point is rigidly connected to the transport unit or a coupling device comprising the relative point is provided on the transport unit, the coupling device comprising kinematics with at least one degree of freedom of movement for the relative point, wherein at least one relative point target value is established for the relative point, the movement profile of the transport unit being established by the control unit such that the relative point target value is adhered to, wherein the relative point target value is a maximum speed and/or a maximum acceleration and/or a maximum relative point centrifugal force of the relative point and/or a predetermined reference distance from a movable or fixed reference point in space.

2. The method according to claim 1, wherein the relative position of the relative point in space relative to the reference point of the transport unit is changed by the kinematics during the movement of the transport unit.

3. The method according to claim 1, wherein at least one holding element for holding an object is arranged on the coupling device, the relative point being provided on the holding element or on the object.

4. The method according to claim 1, wherein a path-time profile or a time derivative thereof is provided as the movement profile of the transport unit and/or as the relative movement profile of the relative point.

5. The method according to claim 1, wherein at least one transport unit target value is predetermined for the reference point of the transport unit, the movement profile of the transport unit being established in such a way that the transport unit target value is adhered to.

6. The method according to claim 5, wherein the transport unit target value is a maximum speed and/or a maximum acceleration of the reference point in the direction of movement of the transport unit and/or transversely thereto and/or a maximum force acting on the transport unit, and/or a maximum torque and/or a predetermined transport unit distance of the reference point from a second reference point of a second transport unit in the direction of movement or in space.

7. The method according to claim 6, wherein the maximum force acting on the transport unit is a maximum centrifugal force.

8. The method according to claim 1, wherein a second relative point or a second reference point of a second transport unit is used as a movable reference point.

9. The method according to claim 8, wherein a relative force acting between the relative point of the transport unit and a second relative point of a second transport unit is predetermined as the relative point target value of the relative point of the transport unit, and wherein the movement profile of the transport unit and/or the movement profile of the second transport unit is established so that the relative force acting between the relative points is adhered to.

10. A transport device in the form of a long-stator linear motor with a transport path, at least one transport unit that is movable in the longitudinal direction along the transport path and a control unit for controlling the transport unit, wherein in the control unit for controlling the movement of the transport unit along the transport path a movement profile of the transport unit is provided for a defined reference point of the transport unit, wherein a relative point connected to the transport unit and spaced from the reference point of the transport unit with a known relative position relative to the reference point of the transport unit is provided on the transport unit, wherein a relative movement profile of the relative point is predetermined in the control unit at least in sections along the transport path, and wherein the control unit is configured to determine the movement profile of the transport unit from the relative movement profile of the relative point, wherein the relative point is rigidly connected to the transport unit or a coupling device comprising the relative point is provided on the transport unit, the coupling device comprising kinematics with at least one degree of freedom of movement for the relative point, wherein at least one relative point target value is predetermined in the control unit for the relative point, wherein the control unit is configured for establishing the movement profile of the transport unit in order to adhere to the relative point target value, wherein the relative point target value is a maximum speed and/or a maximum acceleration and/or a maximum relative point centrifugal force of the relative point and/or a predetermined reference distance from a movable or fixed reference point in space.

11. The transport device according to claim 10, wherein the relative position of the relative point in space relative to the reference point of the transport unit is variable during the movement of the transport unit.

12. The transport device according to claim 10, wherein at least one holding element for holding an object is provided on the coupling device, the relative point being provided on the holding element or on the object.

13. The transport device according to claim 10, wherein a path-time profile or a time derivative thereof is provided as the movement profile of the transport unit and/or as the relative movement profile of the relative point.

14. The transport device according to claim 10, wherein at least one transport unit target value is predetermined in the control unit for the reference point of the transport unit, wherein the control unit is configured for establishing the movement profile of the transport unit in order to adhere to the transport unit target value.

15. The transport device according to claim 14, wherein the transport unit target value is a maximum speed and/or a maximum acceleration of the reference point in the direction of movement of the transport unit and/or transversely thereto and/or a maximum force acting on the transport unit, and/or a maximum torque and/or a predetermined transport unit distance of the reference point from a second reference point of a second transport unit in the direction of movement or in space.

16. The transport device according to claim 15, wherein the maximum force acting on the transport unit is a maximum centrifugal force.

17. The transport device according to claim 10, wherein a relative force acting between the relative point of the transport unit and a second relative point of a second transport unit is predetermined as the relative point target value, and wherein the movement profile of the transport unit and/or the movement profile of the second transport unit is established by the control unit in order to adhere to the relative force acting between the relative points.

18. The transport device according to claim 10, wherein the movable reference point is a second relative point or a second reference point of a second transport unit.

* * * * *